United States Patent Office 3,055,800
Patented Sept. 25, 1962

3,055,800
PURIFICATION OF PYRETHRUM EXTRACTS
Edward S. R. Willmore and Richard F. Phipers, Berkhamsted, England, assignors to Cooper, McDougall & Robertson Limited, Berkhamsted, England
No Drawing. Filed Apr. 26, 1957, Ser. No. 655,189
Claims priority, application Great Britain May 15, 1956
3 Claims. (Cl. 167—24)

This invention relates to new and improved pyrethrins compositions, and particularly to a novel method for the preparation of purified pyrethrum extracts.

Pyrethrum in current practice is practically always employed in combination with certain synergists. These synergists greatly increase the effectiveness of the pyrethrins which are the active principals of pyrethrum, with the result that useful insecticides can be produced at substantially lower cost.

Conventionally, concentrated pyrethrum extracts are prepared by the extraction of pyrethrum flowers and subsequent concentration and purification to varying degrees. These extracts are then mixed with the appropriate synergist in the desired proportions. Most advantageous results are obtained by using pyrethrum extracts purified to such a degree that the resultant concentrates and insecticides are colourless or practically so, and freed to a maximum extent from waxes and other natural impurities which may be insoluble in the desired solvents. Various methods are known for the production of such purified extracts, but the procedures are relatively complex, difficult to carry out and result in serious losses of pyrethrins.

The present invention provides a method whereby relatively crude pyrethrum extracts are processed in combination with a synergist to produce a substantially colourless and highly purified concentrate, and with virtually total recovery of the valuable pyrethrins. This method is extremely simple, yet it provides for the first time a commercially feasible method for the production of pure synergized pyrethrins compositions.

According to this invention, pyrethrins are co-distilled from crude pyrethrum extracts, using a synergistic compound as co-distillant. Although heretofore it has been believed that pyrethrins could not be heated at high temperatures without the formation of polymerisation and other side products, accompanied by loss of toxicity and decreased solubility, it has now been discovered that the use of certain synergistic compounds as co-distillants protects the pyrethrins against thermal decomposition at the relatively high temperatures required.

Early work in this field has demonstrated the theoretical feasibility of purifying pyrethrins by high vacuum distillation and co-distillation. For example, Goodhue and Haller, U.S. Patent 2,358,392, have described a process whereby crude pyrethrum extracts are purified by molecular distillation with sesame and other oils. However, because of the thermal instability of the pyrethrins, and numerous other disadvantages, these prior methods have found no practical application.

On the other hand, co-distillation of pyrethrins, according to the process described herein, provides not only a simple method for preparing purified pyrethrins, but has the added advantage that the pyrethrins present in the distillate are associated only with the compound with which the pyrethrins will be used, permitting the preparation of highly concentrated as well as highly purified materials. By this method, the isomerization of the pyrethrins into insecticidally inactive isomers, which otherwise occurs if the pyrethrins are heated for any length of time at these high temperatures, is substantially avoided. None of these advantages is obtained from prior art processes.

In carrying out the process of this invention, the preferred co-distillant is a synergist from the class of methylenedioxyphenyl compounds having the generic formula:

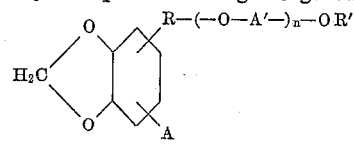

in which R is a saturated, bivalent, aliphatic, hydrocarbon radical, A is a substituent selected from the group consisting of a hydrogen atom and alkyl radicals, R' is a substituent selected from the group consisting of alkyl, cycloalkyl, aralkyl, aryl and heterocyclic radicals, A' is a saturated, bivalent, aliphatic, hydrocarbon radical having from two to three carbon atoms and $n$ is an integer from one to three. Such synergists are described in Patent No. 2,485,681 of Herman Wachs.

Of the compounds encompassed in the above generic formula, piperonyl butoxide (a-2-(2-butoxyethoxy)ethoxy 4,5-methylenedioxy-2-propyl toluene), is the most widely used. Other compounds, such as butoxyethoxyethyl piperonylate are also particularly applicable. It is preferred to use as co-distillant compounds with maximum synergistic effect with pyrethrins. These compounds should boil within the range over which pyrethrins distil. If the compounds are either too volatile or not volatile enough, the co-distillant feature is lost.

Essentially the procedure involves combining pyrethrum extract and the synergist and co-distilling under carefully controlled conditions. It is preferred to carry out the distillation under a vacuum of not more than about 0.3 mm. of mercury. A very high vacuum, such as that necessary for molecular distillation, is not here required. At pressures of 0.1 to 0.15 mm. of mercury the pyrethrins co-distil over a temperature range of about 100–250° C., with the bulk of material distilling over a range of about 150–200° C. Pyrethrum extracts of varying concentration may be employed, but for practical considerations highly concentrated pyrethrum extracts, preferably at least 20 to 25% pyrethrins, are used.

Because of its great effectiveness and availability, piperonyl butoxide is at present the most commonly used synergist for pyrethrins. Piperonyl butoxide exhibits synergism in all proportions with pyrethrins, such that the ratio of these components may be varied over a wide range. At least two parts of piperonyl butoxide per part of pyrethrins is desirable, to form a highly concentrated composition. Of course more co-distillant may be used, any excess distilling over at its boiling point.

Table 1 below presents the results of a series of distillations using a progressively larger charge, said charge consisting of 8 parts of pyrethrum extract containing 25% pyrethrins (equivalent to 2 parts of pyrethrins) and 5 parts of piperonyl butoxide. This mixture was fed into one end of a tubular still, and distilled at a pressure of 0.1–0.15 mm. of mercury. Table 1 shows the percentage of feed material which was removered in the distillate and the percentage of non-volatile residue. The percentage recovery of true pyrethrins is confirmed by bio-assays using *Musca domestica*. It is seen that 99–100% recovery of true pyrethins is obtained.

Table 1

| Amount of feed material, kgs. | Distillate, percent | Non-volatile residue, percent | Loss, percent | True pyrethrins recovered, percent |
|---|---|---|---|---|
| 24.8 | 79.4 | 18.4 | 2.2 | 99 |
| 55.7 | 78.9 | 19.9 | 1.2 | 99 |
| 61.6 | 77.6 | 20.6 | 1.8 | 100 |
| 124.3 | 79.4 | 20.3 | 0.3 | 100 |
| 177.0 | 77.5 | 22.5 |  | 100 |

It is of interest to note that, in purifying very expensive materials such as pyrethrins, a yield difference of even 1% is very significant, such that a process which might yield a recovery of only 97% would by comparison be commercially uninteresting.

In Table 2 below are presented the results of a number of co-distillations using varying proportions of pyrethrins and piperonyl butoxide.

*Table 2*

| Composition | | Boiling range of distillate, °C. | True pyrethrins recovered, percent |
|---|---|---|---|
| Pyrethrins | Piperonyl Butoxide | | |
| 1 | 10 | 100–190 | 99 |
| 1 | 4 | 100–250 | 99 |
| 1 | 2.5 | 100–215 | 99 |

Using synergists other than piperonyl butoxide, similar results are obtained. For instance with butoxyethoxyethyl piperonylate, 99% true pyrethrins were recovered.

Some pyrethrum extracts may contain substances which are volatile, such as odourless kerosene, and it is preferable to remove these before submitting the mixture to the later distillation. This is conveniently done by, first, degassing the material and then distilling the degassed product. The degassing can be carried out by distilling at temperatures of 100–110° C. and at pressures of 3 mm. or less of mercury until the volatile substances have been removed.

In addition to the synergists already indicated, closely related compounds may be used in which the radical —R— is replaced by the radical —O—CH(R″)— to give an acetal, in which case R″ may be selected from the group consisting of alkyl, cycloalkyl, aralkyl, aryl and heterocyclic radicals. A typical compound of appropriate boiling point is 2-(2-ethoxyethoxy)-alkyl 3:4-methylenedioxyphenyl acetal of acetaldehyde where the alkol is butyl. The preferred boiling range is 150–200° C. at 0.1 mm. Hg.

It is truly surprising that a material as thermosensitive as pyrethrins can be subjected to conventional distillation processes, making unnecessary the "molecular" stills of the prior art. Because of the protective effect of the piperonyl derivative employed, it is now possible to provide substantially colourless, highly purified synergized pyrethrins compositions of greatly enhanced utility and of highly improved quality.

As many modifications of this invention can be made without departing from the spirit and scope thereof, it is to be understood that the invention is not limited to the specific embodiments described herein.

We claim:

1. A process of purifying crude pyrethrum extracts at 150–200° C. at 0.1 mm. mercury pressure which comprises codistilling the extract with a pyrethrin synergist selected from the group consisting of piperonyl butoxide, butoxyethoxyethyl piperonylate and the 2-(2-ethoxyethoxy)-alkyl 3:4-methylenedioxy phenyl acetals of acetaldehyde.

2. A process of purifying crude pyrethrum extracts by codistillation according to claim 1, in which the codistillation is carried out under a pressure not exceeding 0.3 mm. of mercury.

3. A process of purifying crude pyrethrum extracts which comprises mixing the extract with 2–5 parts of piperonyl butoxide per part of pyrethrins in the extract, and codistilling the mixture under a pressure not exceeding 0.3 mm. of mercury.

References Cited in the file of this patent

UNITED STATES PATENTS

| 2,358,392 | Goodhue et al. | Sept. 19, 1944 |
| 2,485,681 | Wachs | Oct. 25, 1949 |
| 2,894,870 | Wachs | July 14, 1959 |

FOREIGN PATENTS

| 656,058 | Great Britain | Aug. 8, 1951 |

OTHER REFERENCES

Soap and Chemical Specialties, pages 128 and 133, July 1956.